US012263814B2

(12) United States Patent
Fouinat et al.

(10) Patent No.: US 12,263,814 B2
(45) Date of Patent: Apr. 1, 2025

(54) TRIM ELEMENT FOR A VEHICLE ELEMENT

(71) Applicant: FAURECIA Sièges d'Automobile, Nanterre (FR)

(72) Inventors: Didier Fouinat, Saint Cheron (FR); Julie Thomas, Les Aynans (FR); Fabrice Etienne, Belfort (FR); Jérôme Desgranchamps, Vesoul (FR)

(73) Assignee: FAURECIA Sièges d'Automobile, Nanterre (FR)

(*) Notice: Subject to any disclaimer, the term of this patent is extended or adjusted under 35 U.S.C. 154(b) by 295 days.

(21) Appl. No.: 17/867,048

(22) Filed: Jul. 18, 2022

(65) Prior Publication Data

US 2023/0018616 A1 Jan. 19, 2023

(30) Foreign Application Priority Data

Jul. 19, 2021 (FR) ...................................... 2107774

(51) Int. Cl.
*B60R 7/08* (2006.01)
*B29C 37/00* (2006.01)
(Continued)

(52) U.S. Cl.
CPC .......... *B60R 7/081* (2013.01); *B29C 37/0025* (2013.01); *B29C 44/12* (2013.01);
(Continued)

(58) Field of Classification Search
CPC ......... B60R 7/081; B60R 7/043; B60R 7/005; B29C 37/0025; B29C 44/12;
(Continued)

(56) References Cited

U.S. PATENT DOCUMENTS 1,815,028 A 7/1931 Burch
6,406,093 B1 * 6/2002 Miotto ................ B60N 2/5825 297/440.11

(Continued)

FOREIGN PATENT DOCUMENTS

DE 102006058241 B4 6/2011
DE 102011088377 B4 2/2017

(Continued)

OTHER PUBLICATIONS

2 Pcs ABS Plastic Frame Car Storage Net Bag Phone Car Mesh Net Holder RV Storage Boat Cargo Pocket Organizer Framed Mesh Net Pocket with Screws for Auto RV Net (2, 8 × 3 Inch) (Year: 2021).*

(Continued)

*Primary Examiner* — Paul N Dickson
*Assistant Examiner* — Sara Laghlam
(74) *Attorney, Agent, or Firm* — Barnes & Thornburg LLP

(57) ABSTRACT

A trim element for a vehicle element, where the trim element comprises a shell with an inner surface intended to be oriented towards the interior of the vehicle element and an outer surface intended to form a rear surface of the vehicle element, and a pocket fixed to the outer surface of the shell, where the pocket comprises a panel which has a lower and lateral edges and at least one stiffening element arranged in the lower and lateral edges. The shell further comprises at least one groove in which are housed at least one from the lateral edges and/or the lower edge of the panel for assembly of the panel with the shell.

7 Claims, 5 Drawing Sheets

16 20 22 17 18 10 42 40 42 41 44 44 44 Z X Y 13 15 43 14 44 30

(51) Int. Cl.

| | |
|---|---|
| ***B29C 44/12*** | (2006.01) |
| ***B60R 7/04*** | (2006.01) |
| *B29K 75/00* | (2006.01) |
| *B29K 623/00* | (2006.01) |
| *B29L 31/30* | (2006.01) |

(52) U.S. Cl.
CPC .......... *B60R 7/043* (2013.01); *B29K 2075/00* (2013.01); *B29K 2623/12* (2013.01); *B29L 2031/3041* (2013.01)

(58) Field of Classification Search
CPC ............ B29K 2075/00; B29K 2623/12; B29L 2031/3041; B60N 2/6009; B60N 2/5891
See application file for complete search history.

(56) References Cited

U.S. PATENT DOCUMENTS

| | | | | |
|---|---|---|---|---|
| 7,401,842 | B2 | 7/2008 | Nakashita | |
| 8,794,708 | B2 | 8/2014 | Besnard | |
| 10,933,782 | B2 | 3/2021 | Shindo | |
| 2007/0207000 | A1 | 9/2007 | Bohlke | |
| 2007/0257531 | A1* | 11/2007 | Mashimo | B68G 7/052 297/218.3 |
| 2011/0215603 | A1 | 9/2011 | Gutt | |
| 2019/0344690 | A1* | 11/2019 | Shindo | B60N 2/5825 |

FOREIGN PATENT DOCUMENTS

| | | | |
|---|---|---|---|
| EP | 1829746 | A2 | 9/2007 |
| EP | 3486113 | A1 | 5/2019 |
| WO | 2006122919 | A1 | 11/2006 |
| WO | 2012125846 | A1 | 9/2012 |
| WO | 2020153282 | A1 | 7/2020 |

OTHER PUBLICATIONS

Heavy Duty Cargo Net Stretchable, Universal Adjustable Elastic Truck Net with Hooks, Storage Mesh Organizer Bungee for Car, SUV, Truck (Year: 2017).*

French Search Report for French App. No. 2107774 dated Apr. 13 2021, B21101189FR, 8 pages, No English translation available.

* cited by examiner

TRIM ELEMENT FOR A VEHICLE ELEMENT

PRIORITY CLAIM

This application claims priority to French Patent Application No. FR2107774, filed July 19, 2021, which is expressly incorporated by reference herein.

BACKGROUND

The present disclosure relates to a trim element for a vehicle element where the trim element comprises a pocket, in particular a map pocket for a vehicle seat, and in particular a seatback for an automotive vehicle seat. A production method such a pocket is also described.

SUMMARY

According to the present disclosure, a trim element of a vehicle element is described comprising:

a shell with an inner surface intended to be oriented towards the interior of the vehicle element and an outer surface intended to form a rear surface of the vehicle element, and a pocket fixed to the outer surface of the shell, where the pocket comprises a panel which has a lower and lateral edges and at least one stiffening element arranged in the lower and lateral edges;

where the shell further comprises at least one groove in which are housed at least one from the lateral edges and/or the lower edge of the panel for assembly of the panel with the shell.

In that way, advantageously, the groove serves to attach the pocket to the shell. In that way it is not necessary to add a frame or another element of any kind for holding the pocket on the shell.

In illustrative embodiments:

the shell is plastic and/or comprises a polyurethane-based material;

attachment members engage with the stiffening element and the shell near the groove in order to attach the pocket to the shell;

the attachment members pass through the shell from both sides of the at least one groove in order to hook the stiffening element to the shell;

the attachment members are rings extending from the side of the inner surface of the shell from both sides of the at least one groove.

In illustrative embodiments, a production method for a trim element of a vehicle element is also described, where the method comprises:

providing a mold with shape complementary to at least one groove intended for housing a lower and lateral edges of a panel of a pocket therein;

applying on a first surface of the mold at least one material for getting the shell by forming the at least one groove.

In illustrative embodiments, the method may also provide:

the material for getting the shell comprises plastic and/or polyurethane;

the material is polyurethane and viscous during application thereof;

the material is polyurethane and is sprayed on a functional transfer film for getting at least one polyurethane layer, where the functional transfer film is preferably polypropylene and brought against a back surface of a textile, leather or synthetic material, and in which the assembly formed by the polyurethane layer, the functional transfer film and the textile, leather or synthetic material is pressed in the mold for forming the groove;

in advance of the application of at least one material in the mold for getting the shell by forming the at least one groove, applying at least one paint layer against a first surface of the mold, and the application step further comprising applying on the first surface of the mold a first layer of water-free polyurethane on the paint layer, and applying a second layer of polyurethane having a formulation containing water and a foaming catalyst at the time of application thereof on the first polyurethane layer;

a layer of unmolding agent is applied against the first surface of the mold before application of the paint layer;

the second polyurethane layer is formed on a functional transfer film before application of the second polyurethane layer on the first polyurethane layer, where the assembly formed by the second polyurethane layer and the functional transfer film is applied onto the first polyurethane layer, and where the functional transfer fell is withdrawn after application of the second polyurethane layer onto the first polyurethane layer;

providing the panel of the pocket, comprising a stiffening element arranged in the lateral and the lower edges, placing the lateral and lower edges in the at least one groove, from the side of the second layer of the shell, attaching the lateral and lower edges to the shell by attachment members.

In illustrative embodiments, a trim element is also described for which the vehicle element is selected from a vehicle instrument panel, a vehicle door panel, a vehicle center console. The vehicle element may also be a vehicle seat when the pocket is a map pocket.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 schematically shows an example of the vehicle seat comprising a map pocket, in expanded view;

FIG. 2 schematically shows in section a sample implementation of the seat comprising a map pocket;

FIG. 3 schematically shows in section another sample implementation of the seat comprising a map pocket;

FIG. 4 shows in detail a portion of the seat comprising a map pocket from FIG. 2;

FIG. 5 schematically shows in section another sample implementation of the seat comprising a map pocket;

DETAILED DESCRIPTION

In the various figures, the same references designate identical or similar items. In the interest of conciseness, only the elements, which are useful for understanding the embodiment described, are shown on the figures and are described in detail in the following.

In the following description, when referring to absolute position qualifiers, such as the terms "front," "rear," "top," "bottom," "left," "right," etc., or relatives such as the terms "above," "below,", "upper," "lower," etc. or orientation qualifiers, such as "horizontal," "vertical," etc., unless indicated otherwise refer to the orientation of the figures or of a vehicle seat in the normal position of use thereof.

In particular, the longitudinal direction X extends in the longitudinal direction of the seat. The longitudinal direction of the seat may be the same as the longitudinal direction of the automotive vehicle in which the seat is mounted. This longitudinal direction X corresponds to the normal direction of forward motion of the vehicle. The longitudinal direction X is horizontal. The transverse direction Y of the seat thus corresponds to the transverse or lateral direction of the automotive vehicle. This transverse direction corresponds to a direction perpendicular to the normal direction of forward motion of the vehicle. The transverse direction Y is horizontal. Finally the vertical direction Z is a vertical direction of the seat, perpendicular to the longitudinal and transverse directions.

Figure 1:
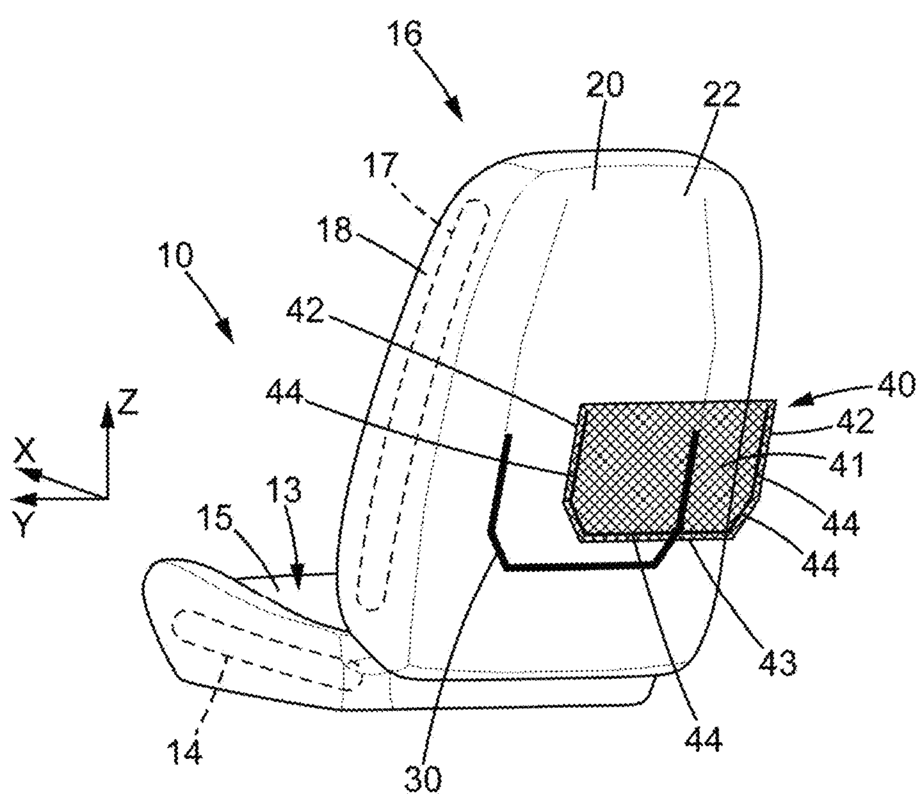

FIG. 1 schematically shows an automotive vehicle seat 10.

The seat 10 comprises a seat bottom 13, with a seat bottom framework 14 and seat bottom trim 15, on which the seatback 16 with a seatback framework 17 and a seatback trim 18 is mounted.

Figure 2:
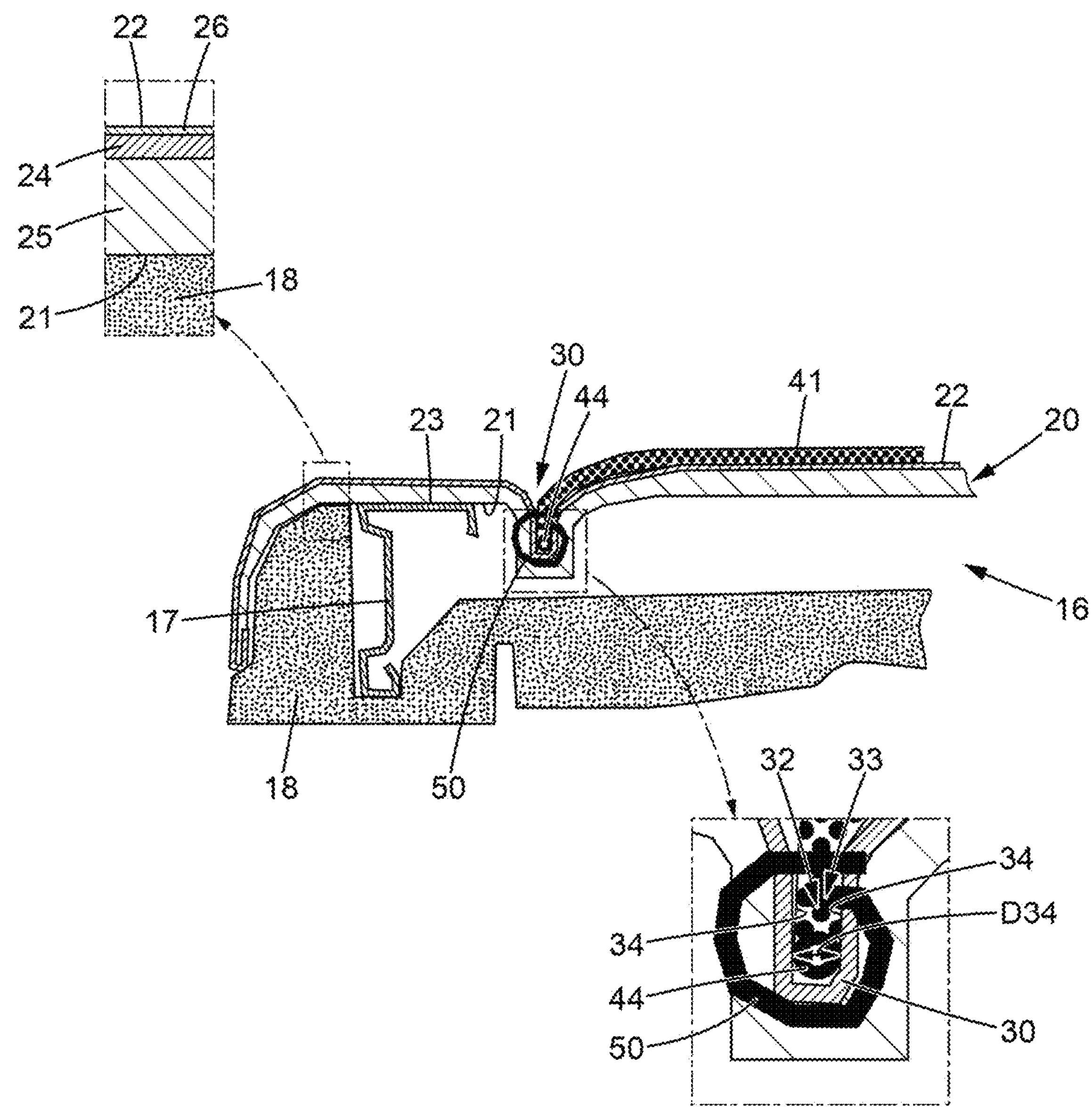

As shown in FIG. 2, the seatback trim 18 comprises a shell 20. The shell 20 comprises an inner surface 21 and an outer surface 22. The inner surface 21 is fixed on the rear surface 23 of the seatback framework 17. The inner surface 21 is not visible to an occupant of the vehicle. The inner surface 21 is called "surface B." The outer surface 22 is the surface visible to an occupant of the vehicle. The outer surface 22 is called "surface B."

The shell 20 comprises a plastic layer. The shell 20 may thus comprise a stiff plastic, such as polycarbonate. Preferably, the plastic layer may be composed of a semi-stiff material, for example polyurethane. More specifically, the shell 20 may comprise several polyurethane-based layers. In particular, as shown in FIG. 2, the shell 20 may comprise a first layer 24 and a second layer 25. The first layer 24 is arranged from the side of the outer surface 22 whereas the second layer 25 is arranged from the side of the inner surface 21. In other words, the first layer 24 is arranged closer to the outside than the second layer 25. The second layer 25 may in that way form the inner surface 21. Further, the first layer 24 may form the inner surface 22.

The first layer 24 may be unexpanded polyurethane. The first layer 24 may have a thickness included between 1 and 3 mm. For example, the first layer is 2 mm thick. Since the polyurethane is not expanded, the first layer 24 comprises very little or no trapped air, which gives it some stiffness.

The second layer 25 may be expanded polyurethane, meaning in the form of polyurethane foam. The second layer 25 adheres to the first layer 24. The second layer 25 may further have a thickness included between 2.5 and 10 mm. For example, the second layer 25 is 9 mm thick.

Further, the first layer 24 may be supplemented by one or more paint layers 26. The paint layer 26 is arranged on the side of the outer surface 22, meaning the opposite side from the second layer 25. More specifically, the paint layer 26 penetrates into the first layer 24. The paint layer 26 is the final layer visible by an occupant of the vehicle. The paint layer 26 is for example a paint film, whose thickness may be included between 10 and 20 μm, for example 15 μm. The paint layer 26 provides additional stiffness to the first layer 24.

Figure 3:
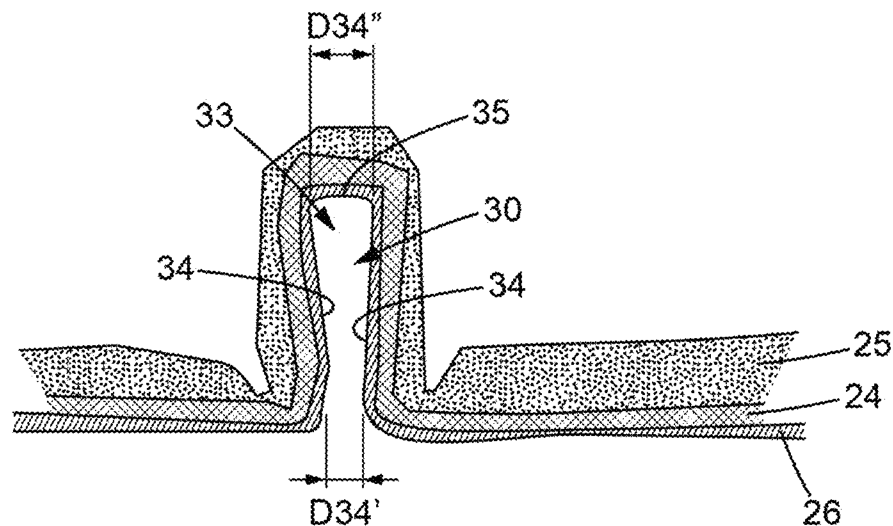
Figure 4:
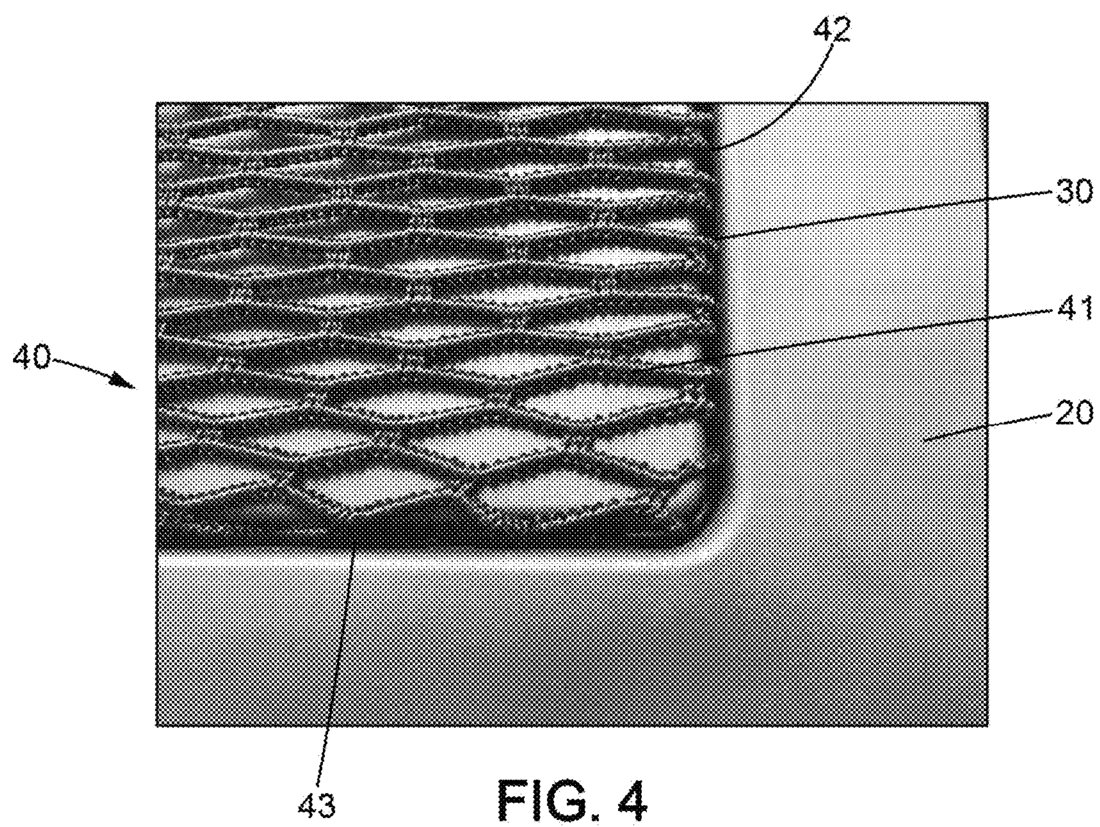

The shell 20 further comprises at least one groove 30. The groove 30 is intended to receive a pocket, in particular a map pocket 40, which will be detailed later. In the example shown, the groove travels along the shell on a U-shaped path, in order to correspond to a rectangular shaped map pocket. Just the same, they shape is in no way limiting, and any other shape is conceivable (for example oval or triangular) according to the preferred final shape for the map pocket. Further, the term "groove" should be understood to mean a hollow shape extending over the shell but not passing through it. For this purpose, the groove does not comprise a slit intended for allowing the edges of a panel forming the pocket (which will be described later) to pass. The convex part 31 of the groove 30 is formed by the inner surface 21 of the shell 20. The concave part 32 of the groove 30 is formed by the outer surface 22 of the shell 20. Described differently, the groove 30 projects in the inner surface 21 of the shell 20. A vehicle occupant, who sees only the outer surface 22 of the shell, sees a hollow part, or reinforcement or groove on the seatback of the seat. For example, according to FIG. 2, where the groove 30 is shown in a section view, it can be seen that the groove can in that way have a U-shape. Alternatively, conforming to FIG. 3, the groove 30 may be implemented with dovetail shape. A dovetail shape is the advantage of keeping the map pocket in the groove, since the groove tightens on itself. Further, the holding function of this dovetail shape is amplified by a semi-stiff material which makes up the shell. An embodiment of the groove 30 is shown in FIG. 4.

Referring to FIG. 2, the concave part 32 of the groove 30 forms a free space, or concavity 33. The concavity 33 is delimited by the outer surface 21 whose portions 34 face each other. The portions 34 are separated from each other by a distance D34. The distance D34 is configured for receiving a portion of the map pocket 40; this is detailed later. For example, the distance D34 is included between 1 and 15 mm. For example, the distance D34 may be included between 1 and 6 mm, when the panel 41 of the map pocket (detailed below) is a net. In the case of a groove 30 with U-shaped profile (FIG. 2), the distance D34 is identical over the full depth of the groove 30. In contrast, in the case of a groove 30 with a dovetail profile (FIG. 3), the distance D34 varies. For example, the portions 34 are inclined relative to each other, and spaced at a distance D34' at the outlet of the concavity, and spaced the distance D34" at the bottom of the concavity, where the distance D34' is smaller than the distance D34". For example, the distance D34' may be included between 0.8 mm and 5 mm, preferably 1 mm. Further, for example, the distance D34" may be included between 1 mm and 15 mm, preferably between 4 mm and 10 mm.

FIG. 1 further shows an example of a map pocket 40, where the map pocket 40 here is detached from the rest of the shell 20.

The map pocket 40 is composed in particular of a panel 41. The panel 41 may for example be a net or fabric, or a leather or vinyl part. The panel 41 is laterally delimited by the lateral edges 42. The lateral walls 42 are joined in the bottom part by a lower edge 43.

The map pocket 40 further comprises a stiffening element 44. The stiffening element 44 is arranged on the surround of the panel 41, for example in the lateral 42 and lower 43 edge of the panel. The stiffening element 44 is for example a series of stiff bars, for example of metal. The stiffening element may according to another example, and as shown in FIGS. 1 and 2, be a stiff wire. For example the stiff wire 44 is a metal wire. The stiff wire 44 may according to another example be a plastic rod. The stiffening element 44 is intended to be housed in the groove 30. More specifically, the stiffening element 44 is intended to be housed in the concavity 33 of the groove 30. For that purpose, the groove 30 is provided with at least one length identical to that of the stiffening element. Additionally, the groove 30 may have a length greater than that of the stiffening element.

The assembly of the map pocket 40 to the shell 20 may be done solely by tight contact in the groove 30 between the lateral 42 and lower 43 edges comprising the stiffening element 44. In fact, because of the mechanical properties of the polyurethane shell 20, the groove form to sufficiently strong to retain the panel 41. That way it is the mechanical properties of the shell which confer sufficient strength for holding the panel 41 in place. Consequently the attachment of the panel 41 does not require an additional element. The distance D34 of the portion 34 of the concavity 33 is further intended for inserting the surround of the panel 41 comprising the stiffening element 44 and holding it by tight contact. In other words, the groove 30 receives the surround of the panel 41 and can hold the panel without recourse to additional holding elements.

Depending on the material used for the panel 41, the stiffening element 44 may be retained in the lateral 42 and lower 43 edges according to different variants. For example, in the case of a panel 41 whose material is a net composed of meshes (as shown in FIG. 4), the stiff wire 44 may be tacked down between the meshes. According to another example, in the case of a panel 41 whose material is vinyl or fabric, the stiff wire 44 may be inserted in a hem created by sewing along the lateral 42 and lower 43 edges.

The final result, meaning the visual appearance for the occupant, is shown in FIG. 4. It can be seen that the rear part of the seatback 16 is solely composed of the panel 41, and the shell 20. The assembly of the map pocket 40 to the shell 20 is thus invisible, and does not have any frame or sewing which might exist in comparative solutions.

Alternatively or additionally, the assembly of the map pocket 40 to the shell 20 may be supplemented by attachment members 50. The attachment members 50 engage with the stiffening element 44 and the shell 20. The stiffening element 44 is in that way firmly fixed in the groove 30. "Firmly fixed" is understood to mean that a user cannot, by pulling very hard on the panel 41, detach it from the seatback. This type of attachment has the advantage of not calling for additional parts for the attachment of the panel of the seat pocket, such as a plastic frame, typically. The map pocket is in that way also improved aesthetically.

The attachment members 50 are for example metal rings which close on themselves by means of a crimping tool. This type of ring is referred to, for example, under the name hog ring. The ring passes through the groove 33 for crimping the stiffening element 44 in the concavity 33 and flattening the stiffening element 44 in the bottom of the groove 30. More precisely, a first end and a second end of the ring pass through the shell from the side of the concavity 33 and close on each other while trapping the stiffening element 44. For example, rings can be provided distributed uniformly around the surround of the panel 41, meaning for example two rings per lateral edge 42 and two rings on the lower edge 43.

Figure 5:
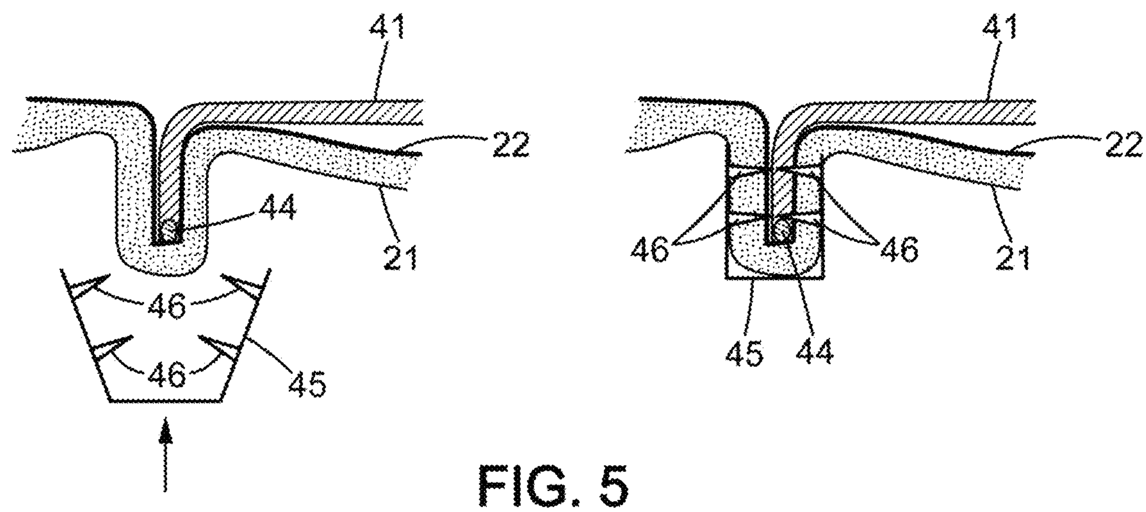

Alternatively or additionally, such as shown in FIG. 5, the attachment members 50 may comprise claw fasteners 45. The claw fasteners 45 may for example be metal or plastic. The claw fasteners 45 may for example engage with the groove 30 from the side of the inner surface 21 of the shell 20. More specifically, the claws 46 of the fasteners, near the groove 30, pass through the shell 20 from the inner surface 21 towards the outer surface 22, for trapping and locking the stiffening element 44.

According to another example, the attachment members 50 may be plastic parts injected with a hinge system for locking the stiffening element 44 in the groove 30.

Figure 6:
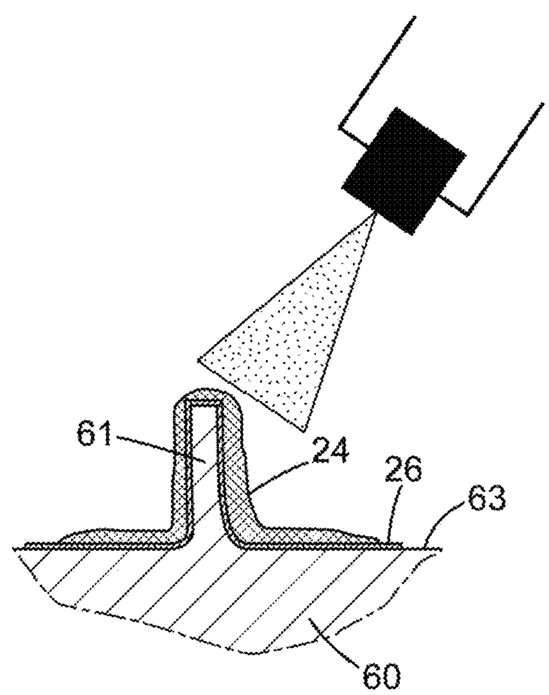
FIG. 6 shows schematically a first step of the production method for the seatback of the vehicle seat from FIG. 1.

In the following, the production method is described for a seatback of the seat and in particular for the map pocket, with reference to FIGS. 6 to 8. FIGS. 6 and 8 show only a portion of a shell 20, in section view, comprising the groove 30.

In a preliminary step, the method comprises:

providing a mold 60. The mold 60 has a shape complementary to that of the groove 30. More precisely the mold comprises a first surface 63 whose shape is complementary to the shape of the concavity 33 of the groove 30. Further, the mold 60 comprises a rib 61. The rib 61 is laid out on the first surface 63 and has a shape complementary to the shape of the concavity 33. According to the example of the map pocket 40 from FIG. 1, the rib 61 then forms a U. According to the example from FIG. 3, the rib 61 then forms an inverted dovetail shape. Further, the mold 60 can be closed, for example, by a cover 64.

Then, the method may comprise:

applying a paint layer 26 against the first surface 63 of the mold 60. The paint layer 26 may be applied by spraying, for example.

In preparation for the paint layer 26, an unmolding agent can be applied to the first surface 63 of the mold 60 by spraying, for example, to make it easier to remove the shell 20 from the mold 60 once it is formed.

The method then comprises:

applying one or more polyurethane layers 24, 25.

In an example where a single polyurethane layer is applied, viscous polyurethane is sprayed on a functional transfer film. The functional transfer film is for example polypropylene and added to a rear surface of the textile, leather or synthetic material. The assembly formed by the polyurethane layer, the functional transfer film and the textile, leather or synthetic material is pressed in the mold 60, preferably cold, for forming the groove 30. During forming, the viscous polyurethane penetrates the textile, leather or synthetic material in order to form a consistent assembly.

Figure 7:
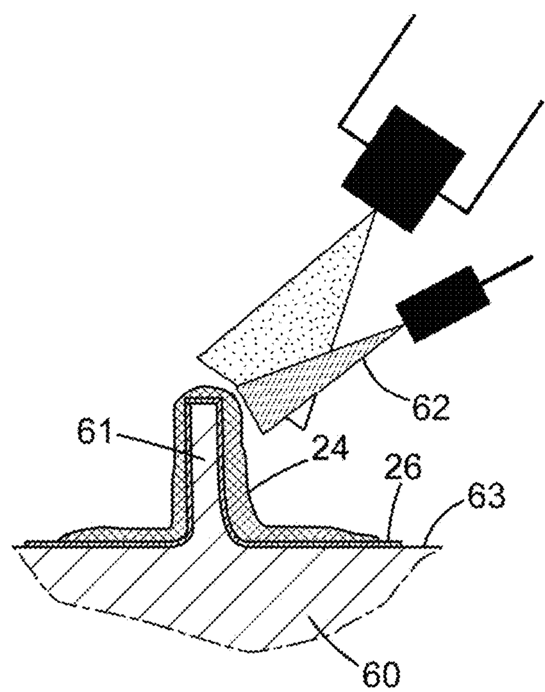
FIG. 7 shows schematically a step following the first step of the production method for the seatback of the vehicle seat from FIG. 1.
Figure 8:
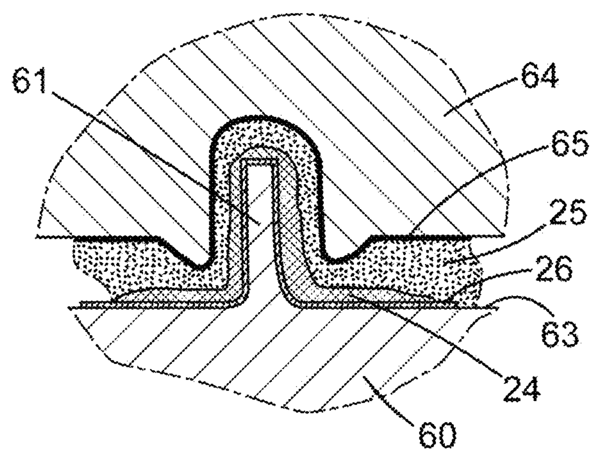
FIG. 8 shows schematically a subsequent step of the production method for the trim of the seat from FIG. 1.

In an example where several polyurethane layers are applied, referring to FIGS. 6 to 8, a material comprising unexpended polyurethane is first sprayed on the paint layer 26. Alternatively, the material may be injected. Here the polyurethane is viscous, meaning it is water free, and is kept in that state. The first layer 24 is then obtained on the mold 60. Next, the second layer 25 is formed.

The second layer 25 as for example overmolded onto the first layer 24. In particular a functional transfer film can be provided on which the second polyurethane layer 25 is formed before application thereof onto the first polyurethane layer 24. More specifically a material comprising expanded polyurethane is injected or sprayed onto the functional transfer film in order to gather the second layer 25, where the polyurethane has a formulation containing water and a foaming catalyst. The assembly formed by the second polyurethane layer 25 and by the functional transfer film is then applied onto the first polyurethane layer 24. Then the assembly is shaped. A cover 64 is for example provided on top of the first layer 25 and the assembly comprising the functional transfer film. The cover 64 is arranged away from the first layer 24, corresponding to the intended thickness of the second layer 25. Then, the shaping is done for example while hot. Finally the functional transfer film is withdrawn from the second polyurethane layer 25.

The paint layer 26, the first layer 24 and the second layer 25 in that way adhere to each other in order to form a coherent material for the shell 20.

Further, the method may also provide a reinforcing web 65. The reinforcing web 65 may for example be fiberglass or a nonwoven material. In the example of the injection of material comprising expanded polyurethane, the reinforcing web 65 is thus overmolded, by adherence and penetration of the expanded polyurethane into the reinforcing web 65. The reinforcing web 65 provides additional stiffness to the shell 20.

The functional transfer film can also be provided with the reinforcing web 65.

Alternatively and additionally, the material comprising unexpanded polyurethane further comprises reinforcing fiber 62. Then the paint layer 26 is sprayed on reinforcing fibers 62, providing an additional stiffening of the first layer 24.

In the remainder of the method, the mold 60 and the cover 64 are removed. A shall 20 then results, provided with a groove 30.

Independently of the steps detailed above, the method comprises:

- providing a map pocket panel 41, where the panel 41 is provided with a stiffening element 44.

The method then comprises:

- placing the lateral 42 and lower 43 edges of the panel 41 in the groove 30. This step thus shapes the map pocket 40, such as shown in part by the example from FIG. 4.

The method then comprises: attaching the panel 41 to the shell 20 by attachment members 50. In particular, for example by using the crimping tool, a ring is crimped around the stiffening element 44 in the groove 30 from the inner surface 21 (meaning the side of the second layer 25). According to another example, the fastener 45 is closed around the stiffening element 44 from the inner surface 21.

The above description is relative to a seatback trim for a vehicle seat seatback, where the trim comprises a map pocket. Just the same, without leaving the scope of the present disclosure, the present disclosure may relate to a trim element of an automotive vehicle element, where the vehicle element could be selected from a vehicle seat, a vehicle instrument panel, a vehicle door panel, or a central console of the vehicle.

One example of a comparative map pocket fixed on a seatback. The part forming the pocket is for example a net, or piece of leather, woven or un-woven textile, or synthetic material. The part is fixed to the seatback by a stiff frame, generally plastic, that is attached to the seatback.

The plastic frame serves to firmly hold the pocket to the seatback but is not aesthetic and uses complex mounting, leading to an increased production cost. From a perspective of simplifying production of the map pocket and improving integration with the seatback, comparative solutions are not satisfactory.

The aim of the present disclosure is to improve the situation as discussed in the comparative map pocket.

For this purpose, a trim element of a vehicle element is described comprising:

- a shell with an inner surface intended to be oriented towards the interior of the vehicle element and an outer surface intended to form a rear surface of the vehicle element, and
- a pocket fixed to the outer surface of the shell, where the pocket comprises a panel which has a lower and lateral edges and at least one stiffening element arranged in the lower and lateral edges;
- where the shell further comprises at least one groove in which are housed at least one from the lateral edges and/or the lower edge of the panel for assembly of the panel with the shell.

In that way, advantageously, the groove serves to attach the pocket to the shell. In that way it is not necessary to add a frame or another element of any kind for holding the pocket on the shell.

According to preferred embodiments, the trim elements comprises one or more of the following characteristics taken alone or in combination:

- the shell is plastic and/or comprises a polyurethane-based material;
- attachment members engage with the stiffening element and the shell near the groove in order to attach the pocket to the shell;
- the attachment members pass through the shell from both sides of the at least one groove in order to hook the stiffening element to the shell;
- the attachment members are rings extending from the side of the inner surface of the shell from both sides of the at least one groove.

According to another aspect, a production method for a trim element of a vehicle element is also described, where the method comprises:

- providing a mold with shape complementary to at least one groove intended for housing a lower and lateral edges of a panel of a pocket therein;
- applying on a first surface of the mold at least one material for getting the shell by forming the at least one groove.

The method may also provide:

- the material for getting the shell comprises plastic and/or polyurethane;
- the material is polyurethane and viscous during application thereof;
- the material is polyurethane and is sprayed on a functional transfer film for getting at least one polyurethane layer, where the functional transfer film is preferably polypropylene and brought against a back surface of a textile, leather or synthetic material, and in which the assembly formed by the polyurethane layer, the functional transfer film and the textile, leather or synthetic material is pressed in the mold for forming the groove;
- in advance of the application of at least one material in the mold for getting the shell by forming the at least one groove, applying at least one paint layer against a first surface of the mold, and the application step further comprising applying on the first surface of the mold (60) a first layer of water-free polyurethane on the paint layer, and
- applying a second layer of polyurethane having a formulation containing water and a foaming catalyst at the time of application thereof on the first polyurethane layer;
- a layer of unmolding agent is applied against the first surface of the mold before application of the paint layer;
- the second polyurethane layer is formed on a functional transfer film before application of the second polyurethane layer on the first polyurethane layer, where the assembly formed by the second polyurethane layer and the functional transfer film is applied onto the first polyurethane layer, and where the functional transfer fell is withdrawn after application of the second polyurethane layer onto the first polyurethane layer;

providing the panel of the pocket, comprising a stiffening element arranged in the lateral and the lower edges, placing the lateral and lower edges in the at least one groove, from the side of the second layer of the shell, attaching the lateral and lower edges to the shell by attachment members.

According to another aspect, a trim element is also described for which the vehicle element is selected from a vehicle instrument panel, a vehicle door panel, a vehicle center console. The vehicle element may also be a vehicle seat when the pocket is a map pocket.

The invention claimed is:

1. A seatback of a vehicle comprising a seatback framework and a seatback trim; the seatback trim comprising:

a shell with an inner surface fixed to the seatback framework and an outer surface intended to form a rear surface of the seatback, the shell comprising at least one groove, the shell and its groove being produced by pressing in a mold, a polyruethane based layer, a functional transfer film and at least one of a textile, leather or synthetic material, and a pocket comprising a panel which has a lower and lateral edges and at least one stiffening wire arranged in the lower and lateral edges;

wherein the stiffening wire and at least one from the lateral edges and/or the lower edge of the panel being held by tight contact in the groove of the shell for assembly of the panel with the shell.

2. The seatback of claim 1, wherein the seatback trim comprises attachment members engaged with the stiffening element and the shell near the groove in order to attach the pocket to the shell.

3. The seatback of claim 2, wherein the attachment members pass through the shell from both sides of the at least one groove in order to hook the stiffening element to the shell.

4. The seatback of claim 3, wherein the attachment members are rings extending from the side of the inner surface of the shell from both sides of the at least one groove.

5. The seatback of claim 1, wherein the pocket is a map pocket.

6. The seatback of claim 1, wherein the groove has a U shape profile and the distance between two opposite internal faces of the groove is between 1 millimeter and 15 millimeters.

7. The seatback of claim 1, wherein the groove has a dovetail shape profile and the distance between two opposite internal faces at an outlet of the groove is between 0,8 millimeter and 5 millimeters and the distance between two opposite internal faces at a bottom of the groove is between 1 millimeter and 15 millimeters.

* * * * *